United States Patent [19]

Bibbens

[11] Patent Number: 4,615,099
[45] Date of Patent: Oct. 7, 1986

[54] MACHINE TOOL

[76] Inventor: William H. Bibbens, 16500 N. Park Dr., North Park Towers, Apartment 820, Southfield, Mich. 48075

[21] Appl. No.: 794,266

[22] Filed: Nov. 1, 1985

Related U.S. Application Data

[63] Continuation of Ser. No. 582,165, Feb. 27, 1984, abandoned, which is a continuation of Ser. No. 317,738, Nov. 3, 1981, abandoned, which is a continuation of Ser. No. 167,962, Jul. 14, 1980, abandoned, which is a continuation of Ser. No. 1,791, Jan. 8, 1979, abandoned.

[51] Int. Cl.$^4$ .................... B23C 1/00; B23D 37/00
[52] U.S. Cl. .................................. 29/560; 409/144; 409/243

[58] Field of Search .............. 29/650, 11, 28, 60, 29/144, 243, 257, 262, 269, 271, 274, 277

[56] References Cited

U.S. PATENT DOCUMENTS

3,103,675  9/1963  Vaughn .................... 409/262 X
3,859,893  1/1975  Hodgson .................... 409/11

Primary Examiner—Z. R. Bilinsky
Attorney, Agent, or Firm—Reising, Ethington, Barnard, Perry & Milton

[57] ABSTRACT

A machine tool for cutting a workpiece formed of metal or other machinable material by one of a plurality of selected operations including mill cutting and/or broaching.

2 Claims, 5 Drawing Figures

MACHINE TOOL

This application is a continuation of application Ser. No. 582,165, filed Feb. 27, 1984, which is a continuation of Ser. No. 317,738, filed Nov. 3, 1981, which is a continuation of Ser. No. 167,962, filed July 14, 1980, which is a continuation of Ser. No. 1,791, filed Jan. 8, 1979, all abandoned.

TECHNICAL FIELD

This invention relates to machine tools, and more particularly to a machine tool which has the capability to machine materials by any one of a plurality of selected cutting operations including mill cutting and broaching.

BACKGROUND ART

Among the well-known techniques for metal removal are the operations of mill cutting and broaching. Each of these operations is generally carried out with different types of cutting tools on different machines.

More specifically, the mill cutting operation is usually performed on a mill with a rotational mill cutter. The mill cutter rotates at a relatively high velocity and has teeth formed on its periphery which cut away at the material of the workpiece as the cutter is fed into engagement with the workpiece.

In the broaching operation the workpiece is shaped by pushing or pulling a broach across a surface of the workpiece. The broach is typically a multiple tooth cutting tool in which the teeth are shaped to give a desired surface or contour, and cutting results from each tooth projecting farther than the preceding one. In a rotary broaching operation the broach is rotated one full revolution in each cycle. In the course of the revolution the broach shapes the workpiece into its finished form. The broaching process is very rapid, accurate, and leaves a finish of good quality. It is employed where duplicate parts must be produced in large quantities and frequently to given dimensions within small tolerances.

An objective of the present invention is to provide a machine which can be adapted to perform either a mill cutting operation or a broaching operation. An important design consideration in this regard is that mill cutting and broaching require different feed characteristics of the work to the cutting tool. The present invention addresses this design consideration and provides a machine which is practical in view of these requirements.

DISCLOSURE OF THE INVENTION

The present invention is a machine tool which is adaptable to perform any one of a plurality of selected metal removal operations on a machinable workpiece including either a mill cutting operation or a broaching operation.

In overview, the machine tool of the present invention includes a tool shaft or spindle having one end adapted to receive a selected cutting tool. The cutting tool is preferably a mill cutter or a rotary broach. The tool shaft is connected to and driven by an input shaft. The input shaft is, in turn, connected to a rotational power source, such as a motor.

A set of clamps is positioned in proximity to the selected cutting tool to hold a workpiece which is to undergo cutting, broaching or other like type of cutting operation. The clamps have a clamped position for clamping a workpiece in a position to be engaged by the cutting tool, and an unclamped position to release the workpiece. The clamps are preferably hydraulically actuated between their clamped and unclamped positions.

The set of clamps is mounted on a slide which moves under the control of a feed cam. The feed cam is mounted for rotation on a camshaft which is driven from the tool shaft. The feed cam is selected to provide the feed characteristics required for the cutting tool being used. The shape of the cam will determine the pattern of movement of the slide, and, hence, the feed characteristics of the work relative to the selected cutting tool.

The rotational speed of the selected feed cam is controlled by a gear train interconnecting the tool shaft and camshaft. The gear train includes a gear which is mounted on an adjustable gear mount. The size of the gear may be adjusted.

Other advantages of the present invention will be readily appreciated as the same becomes better understood by reference to the following detailed description when considered in connection with the accompanying drawings.

BEST MODE FOR CARRYING OUT THE INVENTION

The present invention is hereinafter described with reference to both the drawing figures and the photograph exhibits appended hereto and identified as Exhibits A-D. The photograph exhibits illustrate an actual embodiment of the present invention and are used as an adjunct to the drawing figures to aid in the description of the invention. Reference numeral designations used in the exhibits will find like correspondence in the drawing figures.

A machine embodying the present invention is shown generally at 10 in Exhibit A. The machine 10 is adapted to perform either a mill cutting operation or a broaching operation on a workpiece depending on the selection of cutting tool, feed cam and timing gear for controlling the rotational speed of the feed cam.

Figure 1:
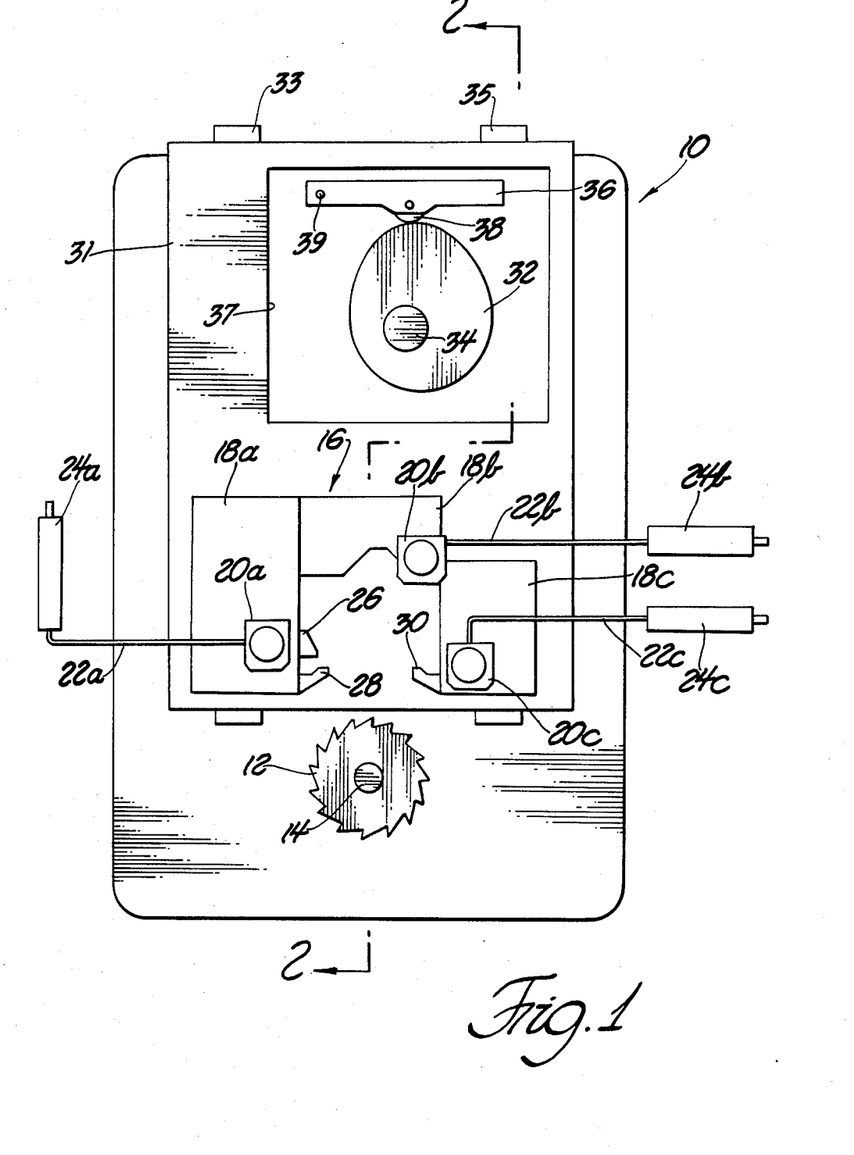
FIG. 1 is a front elevation view in schematic form of a machine embodying the present invention adapted to perform a mill cutting operation.

In FIG. 1 and Exhibit B the machine 10 is equipped to perform a mill cutting operation. The machine 10 has a mill cutter 12 mounted on a tooth shaft 14. A workpiece (not shown) which, for example, may be a casting for a transmission shifting fork can be secured in a clamping mechanism, indicated generally at 16.

The clamping mechanism 16 includes a set of fixture plates 18a, b and c mounted on the machine 10 in fixed relation. Each of the fixture plates 18 has a respective clamp 20a, b and c which is hydraulically actuatable by conventional external switching means (not shown). More specifically, the clamp 20a has a fluid line 22a interconnecting it with a piston 24a; the clamp 20b has a fluid line 22b interconnecting it with a piston 24b and the clamp 20c has a fluid line 22c interconnecting it with a piston 24c.

The clamps 20a, b and c each have a clamped position and an unclamped position, the latter being illustrated in FIG. 1. When the clamps 20 are hydraulically actuated from the unclamped position to the clamped position they rotate and move inwardly along the axis of rotation to secure the workpiece in place. A set of fingers 26, 28 and 30 project inwardly from the fixture plates 18a and 18c to supply rear support for the workpiece.

The clamping mechanism 16 is mounted on a vertical slide 31 which feeds the work to the mill cutter 12. The slide 31 has a pair of ways formed on its back side which seat a complementary pair of rails 33 and 35 that guide vertical movement of the slide.

The slide 31 has an opening or window 37 formed in its upper portion that surrounds a feed cam 32. The function of the feed cam 32 is to control the rate of relative feed of the work to the mill cutter 12. The cam 32 is mounted for rotation on a camshaft 34 which is driven off the tool shaft 14. The contour of the feed cam 32 and speed of revolution of the camshaft 34 determine the feed characteristics of the work to the mill cutter 12. In the embodiment of FIG. 1, the feed cam 32 is adapted for a mill cutting operation.

A cam follower 36 has a wheel 38 which rides on the perimeter of the feed cam 32 through the cutting cycle. The cam follower is pivoted about pin 39 and pivots in relation to the rotational movement of the cam 32. The pivoting motion of the follower 36 actuates suitable hydraulic drive means which move the slide 31 to feed the work into the mill cutter 12.

Figure 2:
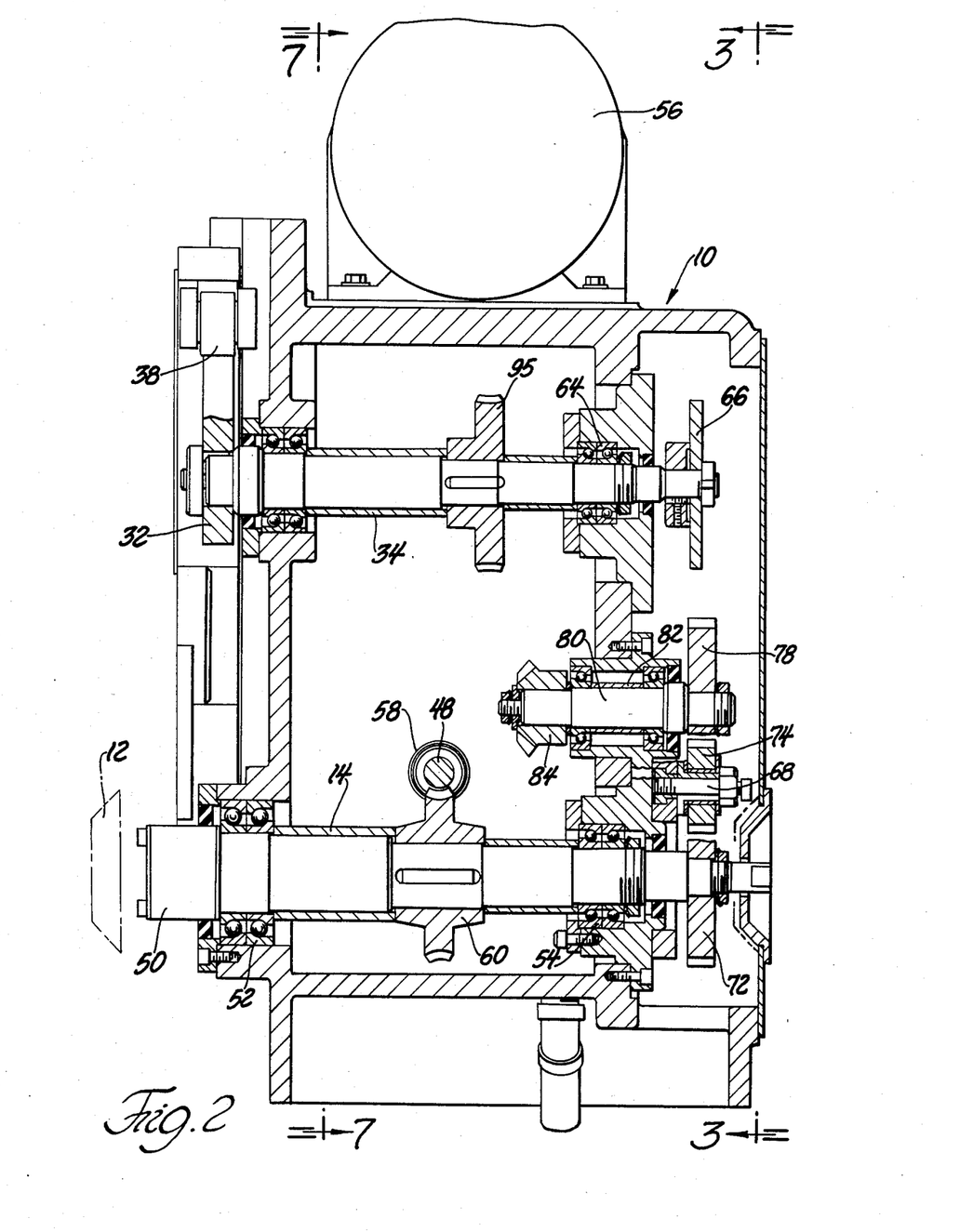
FIG. 2 is a side elevation view in schematic form of the machine of FIG. 1 illustrating the mechanical interconnection of the tool shaft and camshaft.

FIG. 2 is a side elevation view in schematic form of the machine 10 illustrating the mechanical interconnection of the tool shaft 14 and the camshaft 34.

The tool shaft 14 terminates at its front end in an arbor 50 on which can be mounted a cutting tool 12. The shaft 14 is supported for rotation by a pair of bearings 52 and 54.

A drive motor 56 is mechanically connected by a belt and pulley arrangement (see Exhibit C) to an input shaft 48. The input shaft 48 is mechanically connected to the tool shaft 14 through a worm 58 and a worm gear 60. The worm 58 is mounted co-axially on the input shaft 48, and the work gear 60 is mounted co-axially on the tool shaft 14.

A feed cam 32 which is matched to the characteristic of the cutting tool 12, is mounted on the camshaft 34. The cam follower 36 is positioned over the feed cam 32, such that the wheel 38 rides on the periphery of the cam. The camshaft 34 is supported for rotation in bearings 62 and 64. At the rear of the camshaft 34 is a timing disc 66 whose function will hereinafter be described in greater detail.

The rotation of the tool shaft 14 is transmitted to the camshaft 34 through a gear train, indicated collectively at 70. In overview, the gear train 70 is adjustable to correlate the rotational speed of the camshaft 34 with the type of cutting tool 12 being used.

The gear train 70 includes a driving gear 72 mounted on the rear end of the tool shaft 14. The driving gear 72 is in engagement with a gear 74. The gear 74 is mounted for rotation on a shaft 68 which is connected to an adjustable gear mount 76. The gear mount 76 is pivotal about the tool shaft 14 and may be pivoted to accommodate gears of various sizes. The adjustable gear mount 76 will hereinafter be described in greater detail.

A driven gear 78 is in engagement with the gear 74. The driven gear 78 is mounted for rotation on a shaft 80. The shaft 80 is supported by a bearing 82.

The forward end of the shaft 80 terminates in a bevel gear 84. The bevel gear 84 engages a complementary bevel gear 86 which terminates on the lower end of a shaft 88. The shaft 88 is supported for rotation in bearings 90 and 92. The engaged bevel gears 84 and 86 permit the rotational motion of the shaft 80 to be transmitted to the intersecting, perpendicular shaft 88.

A worm 94 is mounted co-axially on the shaft 88. The worm 94 engages a worm gear (not shown) on the camshaft 34 to transmit rotational motion of the shaft 88 to the non-intersecting, perpendicular shaft 34. In this manner, the gear train 70 transmits the motion of the tool shaft 14 to the camshaft 34.

Figure 3:
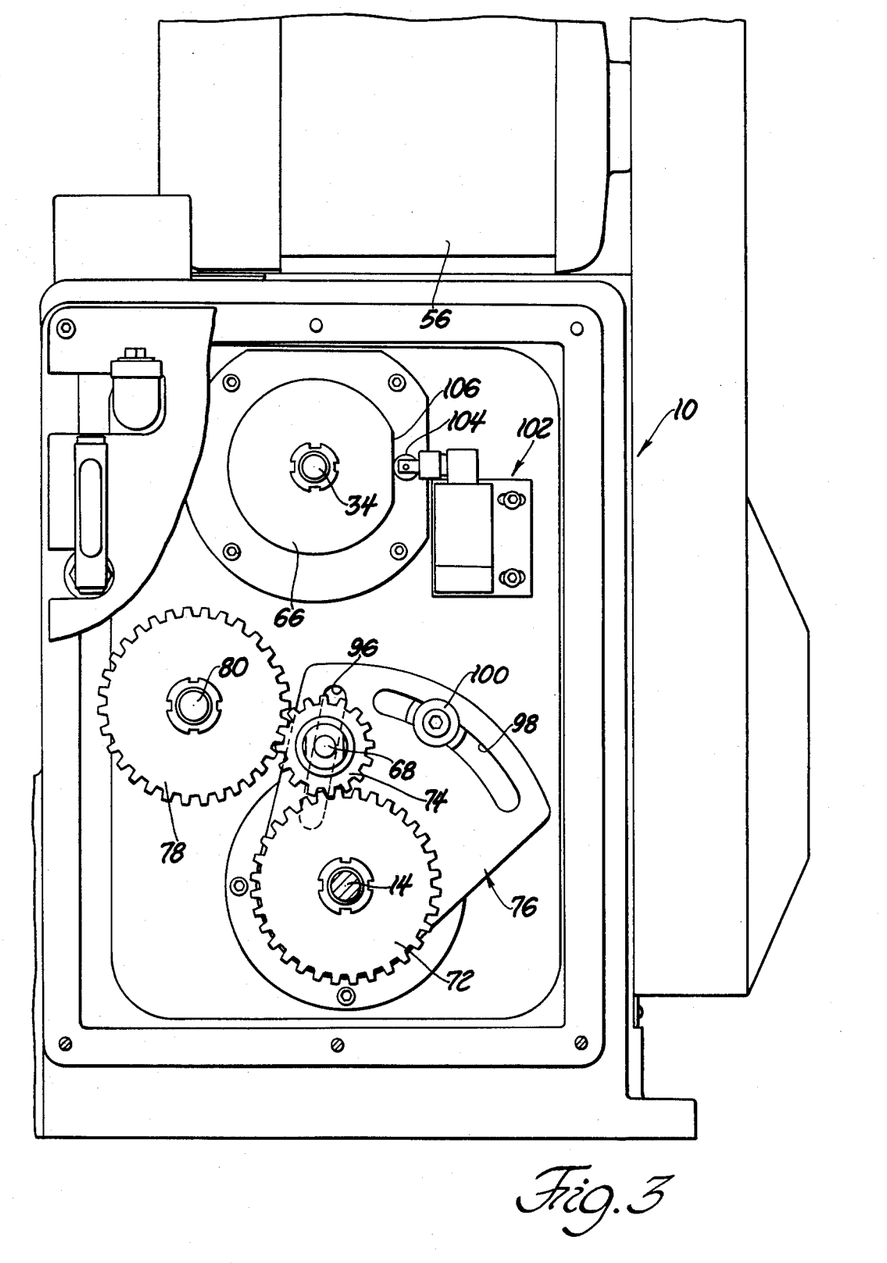
FIG. 3 is a rear elevation view in schematic form of the machine of FIGS. 1 and 2 illustrating the adjustable gear mount of the gear train equipped with a gear suited for a mill cutting operation.

In FIG. 3 and Exhibit D the machine 10 is shown adapted for a mill cutting operation. In particular, the driving gear 72 is mounted for rotation on the tool shaft 14. The driving gear 72 engages the gear 74. In this instance the gear 74 is selected to be relatively small for a mill cutting operation. The gear 74 is mounted on the shaft 68 which is connected to the adjustable gear mount 76.

The adjustable gear mount 76 is pivotal on the tool shaft 14 to accommodate gears of various sizes. The gear mount 76 includes a radial slot 96 which permits selective radial positioning of the shaft 68, and a circumferential slot 98 which allows pivoting of the gear mount. A fastener 100 is used to secure the gear mount 76 in a selected angular position that is appropriate for the size of gear used.

The gear 74 engages the driven gear 78 which is mounted on the shaft 80. The driven gear then transmits its rotational motion through the balance of the gear train described in conjunction with FIG. 2.

The timing disc 66 is mounted on the rear end of the camshaft 34. The timing disc 66 has a generally circular shape except for a flat chordal section 106. A position sensor, indicated generally at 102, senses the presence of the flat chordal section 106 which signifies completion of a cutting cycle. The position sensor 102 includes a follower wheel 104 which normally contacts the periphery of the timing disc 66 except for when the chordal section 106 is adjacent the wheel. The position sensor 102 produces an output signal on line 108 related to the position of the timing disc 66.

Figure 4:
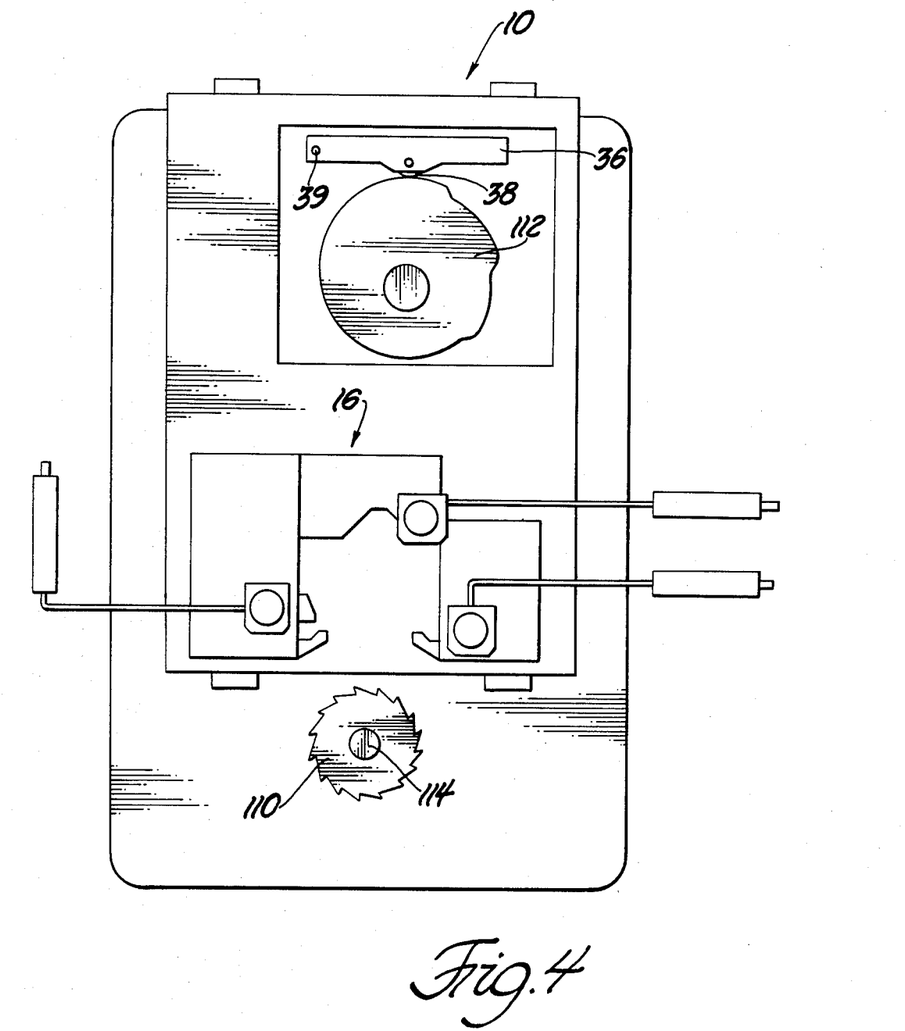
FIG. 4 is a front elevation view in schematic form of the machine of the present invention adapted to perform a broaching operation.
Figure 5:
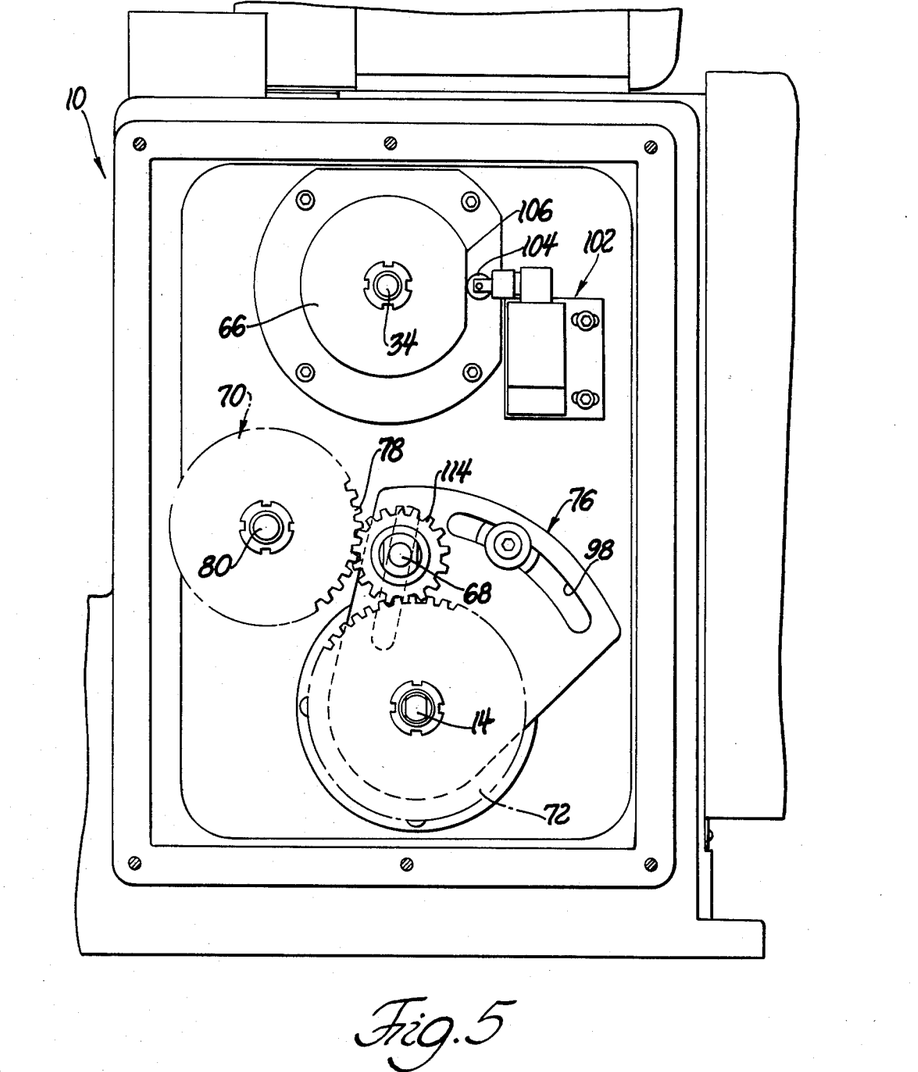
FIG. 5 is a rear elevation view in schematic form of the machine of FIG. 4 illustrating the adjustable gear mount of the gear train equipped with a gear adapted for a broaching operation.
Figure 6:
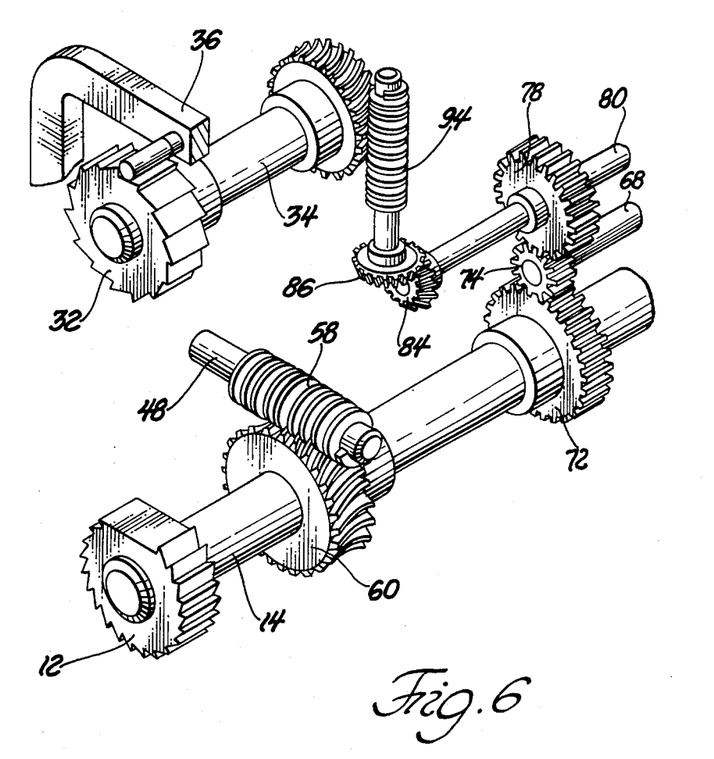
Figure 7:
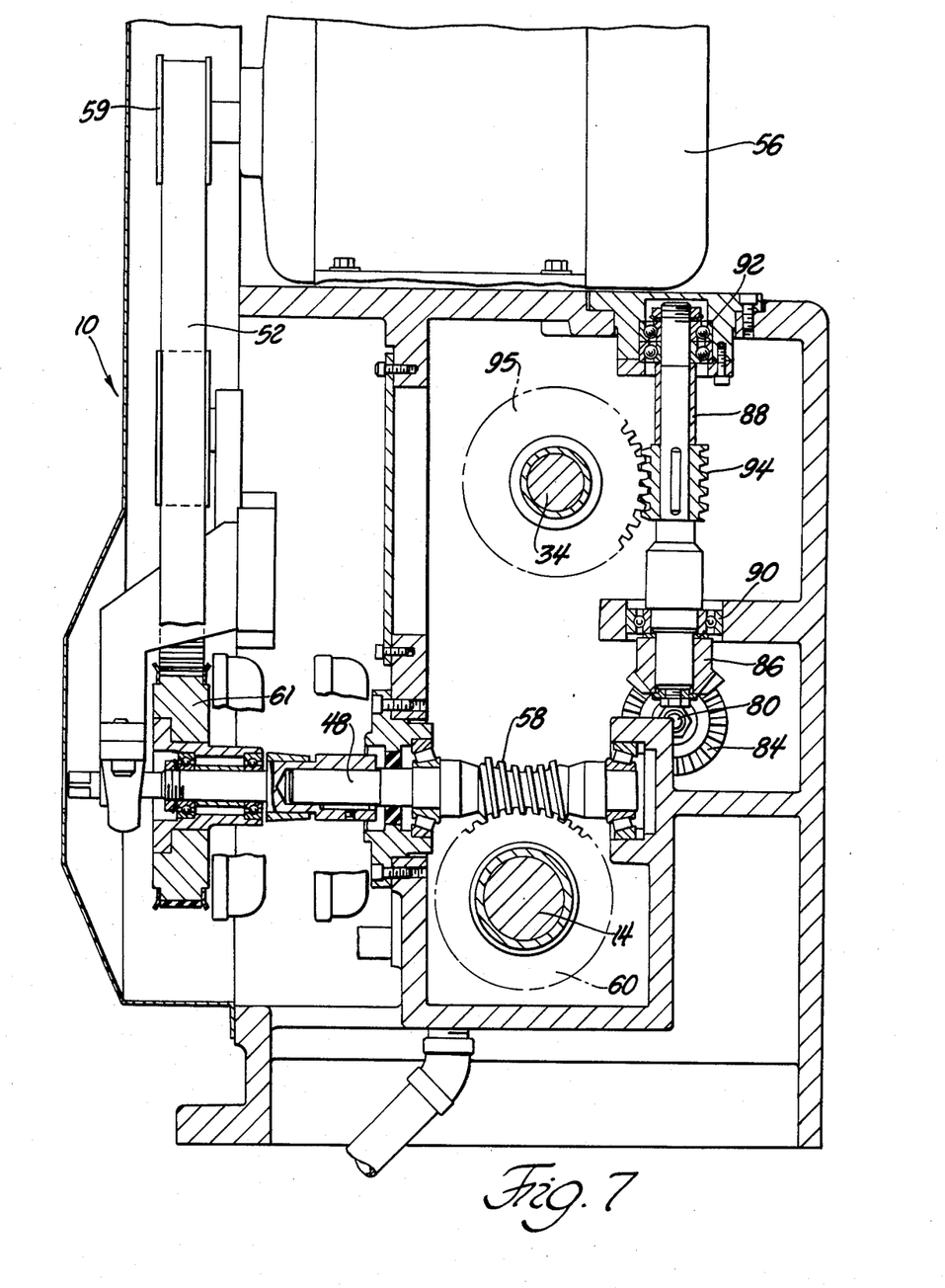

In FIGS. 4 and 5 the views of FIGS. 1 and 3 are repeated subject to modification by the changes necessary for broaching operation instead of a mill cutting operation. More specifically, the following changes are noted: the cutting tool has been changed from a mill cutter to a broach; a larger gear 114 is used; and a different shape feed cam is selected. FIGS. 4 and 5 are otherwise alike FIGS. 1 and 3 and Exhibits B and D.

In FIG. 4 the tool shaft 14 has mounted on it a broach 110. The broach 110 is mounted eccentrically on the shaft 14 to permit progressive engagement of its peripheral teeth, with a workpiece as the tool shaft 14 revolves. The workpiece is, of course, held during engagement with the broach 110 by means of the clamping mechanism, indicated generally at 16.

A feed cam 112 which has a shape suited to the dwell time requirements of the broaching operation is mounted on the camshaft 34. The feed cam 112 controls the reciprocation of the cam follower 36 in the manner previously described.

In FIG. 5 the gear train 70 has been modified to include a different gear 114 matched to the broaching operation. More specifically, the gear 114 has a larger diameter than the gear that was used in the mill cutting operation.

As can be seen in FIG. 5 the adjustable gear mount 76 has been rotated clockwise to accommodate the relatively larger gear 114. Also, the shaft 68 of the gear 114 has been moved radially outward along the radial slot 96 (now obscured by the larger timing gear).

In other words, the adjustable gear mount has been adjusted to change the spacing of the gear support shafts 14,68,80. The size of the gears on any one of the mounts may be changed including gears 72 and 78 thereby matching the timing of the gears to either the broaching or milling operations.

The invention has been described in an illustrative manner, and it is to be understood that the terminology which has been used is intended to be in the nature of words of description rather than of limitation.

Many modifications and variations of the present invention are possible in light of the above teachings. It is, therefore, to be understood that within the scope of the appended claims, the invention may be practiced otherwise than as specifically described.

The embodiments of the invention in which an exclusive property or privilege is claimed are defined as follows:

1. A machine tool for selectively machining a workpiece by a selected one of a plurality of cutting tools comprising: a tool shaft for cutting tool; an input shaft drivingly connected to the tool shaft; clamp means having a clamping position for clamping a workpiece in position to be engaged by the cutting tool, and an unclamped position to release the workpiece; a slide supporting said clamp means, said slide having controlled reciprocal movement for feeding the workpiece to the cutting tool; cam means for controlling movement of the slide; and a gear train including a plurality of gears supported on gear support shafts drivingly connecting the tool shaft and cam means, the gear train including adjustable mounting means including one of said gear support shafts for mounting at least one gear in the gear train and adjustably spacing said gear support shafts.

2. A machine tool as set forth in claim 1 wherein said adjustable mounting means is pivotally mounted on said tool shaft, said mounting means including a radial slot for permitting radial positioning of one of said support shafts relative thereto and a circumferential slot for allowing pivoting of said mounting means and fastening means for fastening said mounting means in a selected angular position.

* * * * *